June 23, 1970   K. C. ALLEN   3,516,504
SCALES
Filed Aug. 31, 1962   2 Sheets-Sheet 1
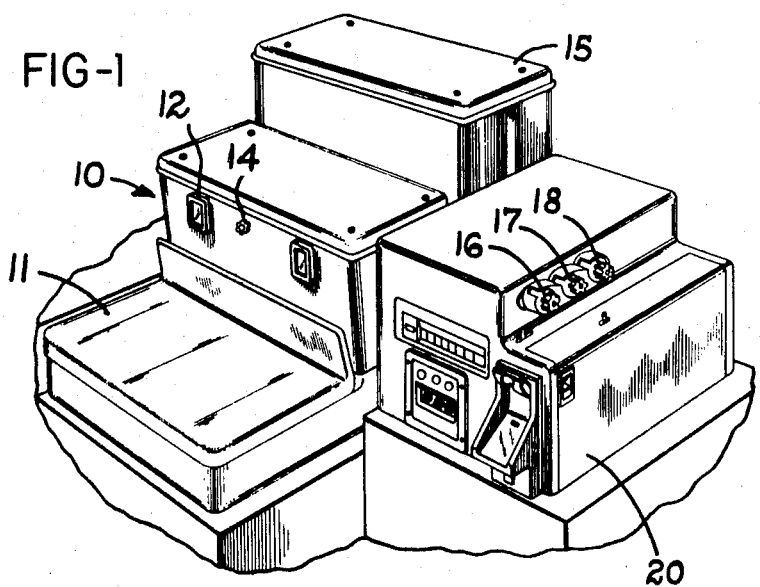
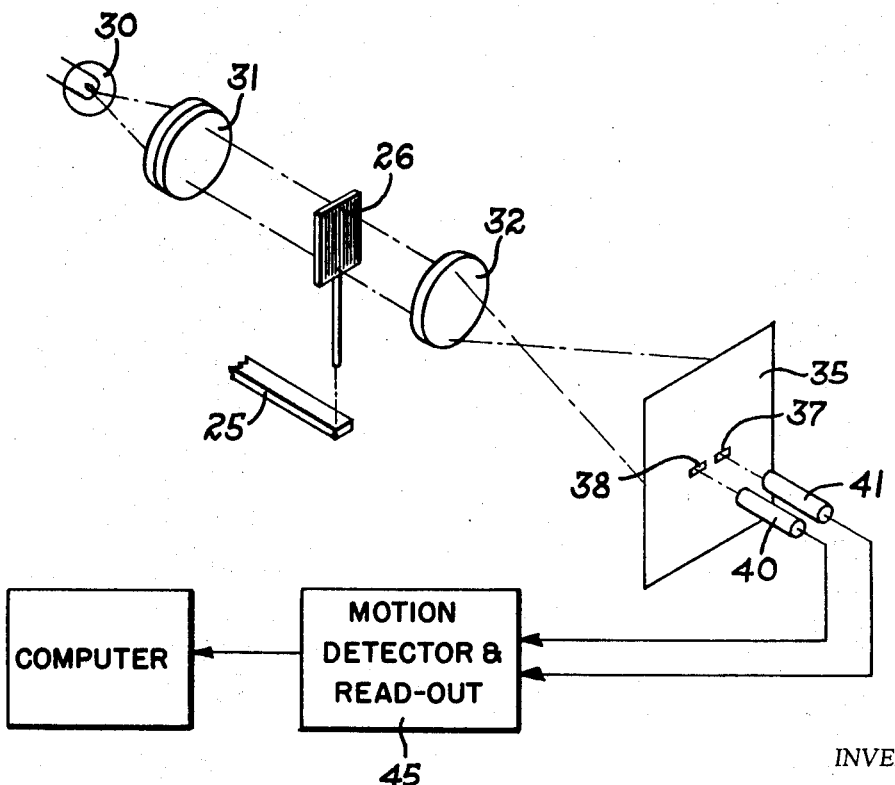
INVENTOR.
KENNETH C. ALLEN
BY
*Marechal, Biebel, French & Bugg*
ATTORNEYS June 23, 1970 K. C. ALLEN 3,516,504
SCALES
Filed Aug. 31, 1962 2 Sheets-Sheet 2
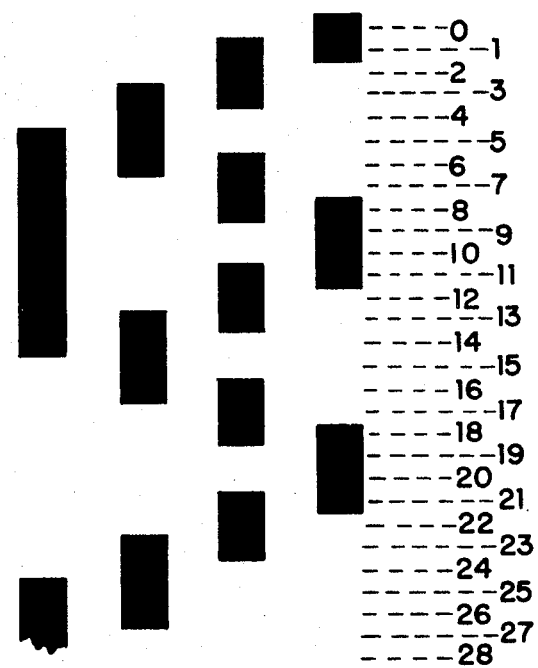
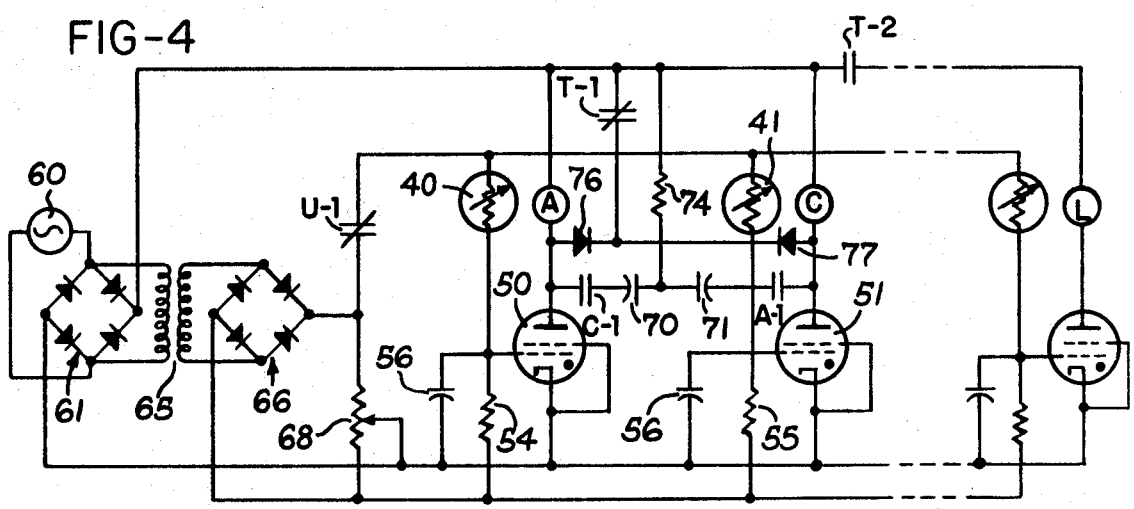
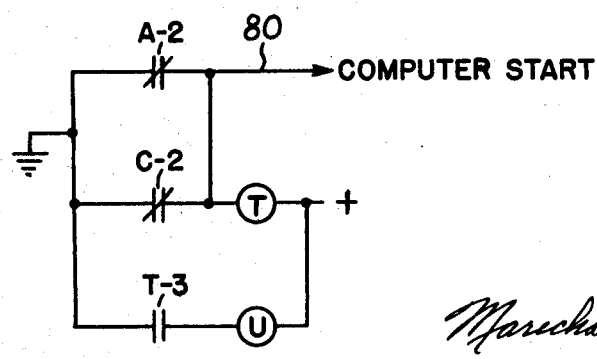
INVENTOR.
KENNETH C. ALLEN
BY
*Marechal, Biebel, French & Bugg*
ATTORNEYS United States Patent Office 3,516,504
Patented June 23, 1970

3,516,504
SCALES
Kenneth C. Allen, Dayton, Ohio, assignor to The Hobart Manufacturing Company, Troy, Ohio, a corporation of Ohio
Filed Aug. 31, 1962, Ser. No. 220,765
Int. Cl. G01g 23/38
U.S. Cl. 177—12                                 3 Claims

ABSTRACT OF THE DISCLOSURE

A motion cessation detector for scale read-out systems comprising photoelectric circuits whereby the movement of the mechanism over a range consisting of "hunting" cause two series of electrical pulses and the movement of the mechanism within a smaller range consisting of vibrational movement causes one series of electrical pulses, said one series of electrical pulses indicating that weighing has been completed.

---

This invention is particularly adapted for use as a motion detector for sensing and signaling the cessation of motion of a scale platform indicating the arrival of the scale at balance with a weight on the platform. The invention may be used with automatic computing scale systems employing a chart read-out to provide a computer with an indication of weight on the scale. However, in its broader aspects, the invention is adapted to provide a positive and unambiguous indication of motion cessation of any movable member with respect to a stationary member.

In previous automatic weighing and computing scales, the arrival of the scale at balance has been indicated by circuits including a single photocell which is positioned to respond to a line or row of alternate opaque and translucent markings on a chart. The single photocell was coupled to a detecting circuit for indicating the fact that motion of the scale platform has stopped when the photocell sees a steady state condition over a predetermined time period.

Such systems of the prior art are susceptible of erroneously indicating the presence of motion when, in fact, the scale has come to balance. This erroneous indication may occur where the balance position of the mechanism results in a condition where the photocell sees a border line of one of the markings on the chart. When this occurs, any slight transient movement, or vibration, or undamped oscillations, such as may be caused by floor-induced vibration, air currents, or by an adjacent running motor, may cause a sufficiently rapid change in the light intensity on the photocell to cause a false indication of continued lever movement even though the scale is at balance.

The above difficulties are eliminated in this invention by providing more than one transducer with each transducer scanning a different part of a chart, and with the chart markings and transducers being so arranged that only one transducer may be at a border line of a chart marking at any instant. In the preferred embodiment, a pair of photocells are employed to scan different parts of a chart, with the chart markings and cells arranged so that only one cell of the pair of cells can be at a border line of a marking at any given relative position of the movable and fixed member.

Although the detailed description of the invention shows a preferred embodiment employing photocells and an optical system including a chart, it should be understood that the invention is not limited to photocells but the teachings herein may be readily applied to other forms of transducers which are responsive to particular discrete areas of a relatively movable member. Where a multicolumn or coded chart read-out is employed, two or more of the transducers normally used for reading the code may also be employed as motion detectors. In such a system, the transducers are positioned to read different individual columns of markings and to detect motion or the cessation of motion through these separate columns, although it is within the scope of this invention to employ a pair of transducers positioned to read a single row or line of markings.

It is therefore an important object of this invention to provide a motion detector for indicating the cessation of movement of a movable member with respect to a fixed member including more than one transducer responsive to markings on the relative movable member with the markings and transducers being arranged so that only one of the transducers is at a border line of a marking at any given relative position of the members.

Another important object of this invention is the provision of a balance attainment indicator for an automatic weighing scale which is unaffected by vibration of a small magnitude, such as vibration which causes chart movement less than the spacing between adjacent markings thereon.

A further object of this invention is the provision of a motion detector for a scale employing a cyclic binary coded chart and photocell read-out wherein a pair of photocells normally used to read the chart code are also employed as motion detectors.

A still further object of this invention is the provision of a motion detector for signaling the arrival at balance of a weighing scale which is unaffected by residual motion or vibration.

Other objects and advantages of the invention will be apparent from the following description, the accompanying drawings and the appended claims.

FIG. 1 is a perspective view of an automatic weighing scale system according to this invention;

FIG. 2 is a somewhat diagrammatic view of a portion of a weighing scale mechanism of FIG. 1;

FIG. 3 is an enlarged fragmentary portion of the chart of FIG. 2 representing a cyclic binary code suitable for use with the motion detecting circuits of this invention; and FIG. 4 is a circuit diagram of the invention.

Referring to the drawings, which illustrate a preferred embodiment of the invention, an automatic computing scale system is shown in FIG. 1 as including a weighing scale 10 having a scale platform 11. The scale 10 is shown as including a window 12 for reading the weight and a tare offsetting means 14.

A computer 15 is shown as being mounted adjacent the scale 10 which receives weight information from the scale for combining with price to compute value. A series of price input knobs 16, 17 and 18 are mounted on a printer 20 and provide the means by which the unit price may be set into the computer 15. The printer 20 operates to print a label of the computed weight and value. The computer and printer of the above-described system may be constructed according to the United States patent to Allen No. 3,045,229 of July 17, 1962, assigned to the same assignee as this application.

It is important to the rapid and accurate operation of the automatic scale system that means be provided for signaling the arrival of the scale at a balance position, for initiating the weight read-out mechanism of the scale and the computer. In FIG. 2 is shown a diagrammatic view of a projecting scale 10, the mechanical and optical portions of which may be constructed according to the United States patent to Meeker et al. 2,723,113, assigned to the same assignee as this application. Therefore, the scale 10 is shown as including the usual balance lever 25 which is connected to move an optical chart 26 in an optical projection system. This projection system may include a projecting lamp 30, a condensing lens system 31 and a projecting lens 32 for projecting an enlarged image of the chart 26 onto the surface of a photocell mask 35.

The chart 26 may be provided only with sufficient markings thereon for the purpose of motion detection in accordance with this invention. However, the chart 26 is preferably formed with a complete matrix of cyclic binary markings arranged in columns so that the relative position thereof may be read by a bank of photocells, with one such cell being associated with each column, providing a binary indication of the weight on the scale. The complete description of a cyclic binary-to-digital read-out system is not necessary to a full understanding of this invention.

The mask 35 of FIG. 2 is shown as being slitted at 37 and 38 so that a small and clearly defined portion of the projected image of the chart 26 is permitted to fall on the windows of the photocell bank which includes at least a pair of photocells 40 and 41. Preferably, the slits 37 and 38 of the mask 35 are of considerably narrower dimension than the finest projected marking on the scale 26, such as in the order of 1:3.

The photocells are preferably of the type which undergo a decrease in resistance with light falling thereon, to operate as current gates or valves. A particularly useful photocell for this purpose is designated CL604 and manufactured by Clairex Corporation, 19 W. 26th St., New York, N.Y.

The output of the cells 40 and 41 is applied to a combined motion detecting and read-out circuit 45, shown and described in greater detail in connection with FIG. 4. A signal from the circuit 45 is employed to initiate the read-out of the chart subsequent to the attainment of a balance condition, as detected and indicated by the photocells 40 and 41.

Chart 26 is provided with markings thereon and, as stated above, these markings preferably represent a cyclic binary code arranged in columns. The fragment of the chart illustrated in FIG. 3 shows a greatly enlarged portion of the columns A through D starting at zero pounds through twenty-eight hundredths of a pound in one hundredths of a pound increments. The coded chart 26 represents the reflected binary code shown in the table below:

|    | NM | LKJI | HGFE | DCBA |
|----|----|----|----|----|
| 0  | 01 | 0001 | 0001 | 0001 |
| 1  | 01 | 0001 | 0001 | 0011 |
| 2  | 01 | 0001 | 0001 | 0010 |
| 3  | 01 | 0001 | 0001 | 0110 |
| 4  | 01 | 0001 | 0001 | 0100 |
| 5  | 01 | 0001 | 0001 | 1100 |
| 6  | 01 | 0001 | 0001 | 1110 |
| 7  | 01 | 0001 | 0001 | 1010 |
| 8  | 01 | 0001 | 0001 | 1011 |
| 9  | 01 | 0001 | 0001 | 1001 |
| 10 | 01 | 0001 | 0011 | 1001 |
| 11 | 01 | 0001 | 0011 | 1011 |
| 12 | 01 | 0001 | 0011 | 1010 |
| 13 | 01 | 0001 | 0011 | 1110 |
| 14 | 01 | 0001 | 0011 | 1100 |
| 15 | 01 | 0001 | 0011 | 0100 |
| 16 | 01 | 0001 | 0011 | 0110 |
| 17 | 01 | 0001 | 0011 | 0010 |
| 18 | 01 | 0001 | 0011 | 0011 |
| 19 | 01 | 0001 | 0011 | 0001 |
| 20 | 01 | 0001 | 0010 | 0001 |

From an examination of the table and of FIG. 3, it will be seen that the markings in the A column never coincide with the markings in the C column. Also, the markings have an extent which is less than the space between adjacent markings in these columns. When the photocell for the A column is at a border line of a marking, the photocell in the C column will lie clearly in the area between markings. Conversely, when the photocell in the C column might be confused by a border line of one of the markings thereon, the photocell for the A column will always be clearly between adjacent markings. Therefore, the arrangement of the chart and the photocells A and C is such that only one of the cells may be at a border line of the projected image of the markings at any given instant.

In practice, the chart of FIG. 3 is extended to a degree commensurate with the weight on the scale, with four binary columns for each decimal value of the weight, as shown in the table. In other words, columns A through D provide binary indication of the weight in hundredths, and columns E through H (not shown) provide indication for the weight in tenths, et cetera, through pounds and tens of pounds up through the scale or computer capacity. Since the markings in the binary columns A through D represent the smallest division of weight, they alternate or change with the greatest frequency, and are therefore preferably used for motion detection.

In the preferred embodiment of this invention, the actual chart 26 through which light is projected is a negative image of the representation of the chart in FIG. 3. In other words, the markings on the chart consist of the transparent areas which will actuate the photocells, with the remainder of the chart being opaque.

A separate photocell is positioned in relation to an individual slit in the mask 35 for each of the binary columns A through M on the chart 26, with each of the photocells being connected to a suitable circuit for reading out the binary indications across the chart upon the arrival at balance with a load on the scale. The detection circuit for the photocells 40 and 41, in columns A and C, respectively, is described herein as including the additional function of motion detection prior to read out. The invention accordingly includes circuit means connected to each of the photocells or transducers responsive to one of the cells sensing a steady state condition irrespective of the state of the other photocell signaling the fact that the movement of the scale has stopped. This circuit is shown in FIG. 4.

The circuit for each of the photocells includes a relay and a current control or operating device for each relay. The relay A is controlled by the photocell 40 in the A column, and the relay C is controlled by the photocell 41 in the C column of the chart. The relay operating devices are preferably thyratron units, such as the type 5696 thyratron tubes 50 and 51, connected respectively in series with the coils of the relays A and C, for operation directly across an unfiltered, full-wave rectified DC power source. Obviously, transistors or common vacuum tubes may also be employed for control. Alternately, solid state thyratron devices, such as the Shockley four layer diode type 4E200 may be used in lieu of the thyratrons 50 and 51.

The photocells 40 and 41 are connected to control the control grids of their respective thyratrons through a voltage divider consisting of the photocells and fixed resistors 54 and 55, with the thyratron grids being connected therebetween. Therefore, the grid voltage is directly proportional to the change in resistance of the respective photocells. Undesirable transient voltages are bypassed by capacitors 56.

The power supply for the relays and thyratrons may conveniently be an AC source 60 applied through a full wave rectifier 61. The photocells receive power through a step-up transformer 65 and another full wave rectifier 66. The negative sides of the rectifiers are connected through a bias control potentiometer 68 by means of which the bias on the thyratrons may be controlled. The potentiometer 68 is adjusted so that the blur seen by the photocells 40 and 41 during the movement of the chart is sufficient to cause the conduction of the thyratrons by reason of the decrease in resistance of the photocells 40 and 41. The thyratron will also conduct if its respective photocell scans a clear area of the chart, corresponding to the location of one of the markings thereon. Also, the bias control setting and the value of the voltage divider resistors 54 and 55 are such that the thyratrons are driven to cut-off when no light is falling on the photocells through the chart. The inductance of the relay coils provides sufficient continuous current to hold the thyratrons in a continuously conductive state, after they have been fired. Diodes 76 and 77 are connected across relay coils A and C through the normally closed contacts T–1 of relay T to bypass the inductive current and thus permit the unfiltered power supply to turn off the thyratrons each half of the power supply cycle. The thyratrons are thus completely under the control of the photocells.

The circuit further includes means for sensing when one of the photocells sees a steady state dark condition for a predetermined time interval for signaling the occurrence of a balance condition regardless of the state of the other photocell. This includes a holding capacitor 70 connected in parallel with the relay A through a normally open control contact C–1 of relay C, and a similar capacitor 71 connected in parallel with the relay C through a normally open contact A–1 of the relay A. The parallel circuit path is completed by a common capacitor-charging path including a current limiting resistor 74.

As shown in FIG. 4, the relays A and C have normally closed control contacts A–2 and C–2 connected in parallel, with each of these relays being effective to operate the control relay T. Additionally, each of these contacts is effective to close a path to the lead 80 designated as the "computer start" lead. Accordingly, these relay contacts comprise the circuit means responsive to one of the photocells seeing a steady state condition signaling the cessation of movement of the movable member. The contacts A–2 and C–2 may be considered as the equivalent of the motion detector designated as the normally closed contacts of N in line 640 of FIG. 12 of the above-mentioned U.S. Pat. No. 3,045,229 for signaling that the scale has come to balance, and initiating the weight read-out of the computer.

In the operation of the invention, a weight is placed upon the platform 11 of the scale 10, causing a deflection of the scale lever 25, and movement of the chart 26. The movement of the marks on the chart 26 may generate a frequency greater than the response time of the photocells, and thus cause a blur to be seen by the photocells 40 and 41, but even so this results in a decrease in resistance in the photocells and an increase in the voltage at the grid of the thyratron tubes 50 and 51, causing them to fire, and pull in both relays A and C.

The firing of relays A and C causes the opening of the control contacts A–2 and C–2. Contacts A–1 and C–1 are closed thereby permitting the charging of the delay capacitors 70 and 71.

The circuit will remain in this condition until the scale has come to balance and the movement of the chart has ceased. At any given balance position of the scale with a load on the platform, the arrangement of the photocells 40 and 41 and the chart markings is such that the projected image of one of the opaque spaces on the chart between adjacent markings will be positioned opposite one of the cells, regardless of the fact that the other cell may see a border line of one of the markings. When this occurs, the resistance of this one cell will immediately increase due to the fact that no light will be transmitted thereto, and the associated thyratron will be cut off. However, the delay circuit including the capacitor 70 or 71 will prevent the immediate release of the associated relay, but will delay this release for a finite time to assure that the scale is actually at balance and not merely reversing its direction of travel.

After the expiration of this delay period, the capacitor will be discharged through the relay coil to an extent sufficient to permit the associated relay A or C to open. This serves immediately to release the delay on the opposite relay by reason of the breaking of the contacts C–1 or A–1, so that it may also release instantly if the scale indication is such that both A and C are required to be unoperated. The opening of A or C also causes a start signal to be given the computer through contacts A–2 or C–2, and energizes relay T.

The operation of relay T opens the inductive bypass path including the diodes 76 and 77, thus allowing the inductive current of the relay coils to be applied to the A and C thyratrons and maintain them in a fired condition even though the power be removed from the photocell that caused the thyratron to be fired. Since there are no diodes for the remainder of read-out combinations B and D through L they also will become independent once they are fired. Relay T does apply power from the rectifiers 61 to the remainder of the photocell read-out circuits, as represented by the circuit including relay L, and all photocells including 40 and 41 now assume a read-out function and fire the appropriate thyratrons A through L depending upon whether a light or dark area coincides with their photocells.

Relay T also operates relay U through its contacts T–3 and relay U in turn disconnects the photocell power by opening its back contacts U–1 a finite time period after the power was applied to the thyratrons, which may be a few milliseconds. Since the power is now removed from the photocells, the fired thyratrons are now independent of any new movement of the scale and thus can have no effect on the reading. Thus, there is no need for the usual scale holding or locking device at balance, and none is employed. The thyratrons in turn operate the relays A through L, and the coded indication thus provided may be translated into a decimal weight signal by the relay contacts and applied to the computer for immediate utilization.

It may therefore be seen that this invention provides a reliable motion detection circuit which is unaffected by slight vibration or movement, by the employment of a pair of transducers responsive to different portions of a chart. In a read-out system, duplication is avoided by employing photocells normally associated with the read-out portions of the system, although the invention is applicable broadly to motion detection apart from a coded reading system.

The invention also assures that any scale motion which follows the signaling of balance, as described, does not affect the read-out. This is accomplished by permitting the concurrent operation of the photocells and the thyratron circuits for a relatively short time period followed by the removal of power from the photocells. In effect, the read-out circuit takes a quick look at the chart following the balance signal, and is unaffected by subsequent movement.

While the form of apparatus herein described constitutes a preferred embodiment of the invention, it is to be understood that the invention is not limited to this precise form of apparatus, and that changes may be made therein without departing from the scope of the invention.

What is claimed is:

1. In an automatic weighing, computing and recording system which includes (a) a weighing mechanism having relatively movable weighing parts adapted to be deflected away from a zero reference position in proportion to the weight of a load applied thereto to a balance position corresponding to such load, (b) read-out means for converting each balance position of the weighing mechanism into weight information, (c) a computer for receiving and temporarily storing said weight information from the read-out means and for computing and temporarily storing the monetary value of each weighed load, and (d) recording means connected to receive from the computer such stored weight and value information and to record such information upon receipt thereof, said system having an automatic cycle of operations including weight read-out of each balance position of the scale, computing, and recording the weight and monetary value of each of a plurality of successively weighed loads, the improvement comprising motion detecting means effective to distinguish weighing motion of the weighing mechanism from vibrational movement of the moving parts thereof with respect to each balance position of the weighing mechanism, said motion detecting means comprising means generating radiant energy pulses in accordance with movement of the weighing mechanism, first and second translating means changing said radiant energy pulses to two series of electrical pulses upon motion of the weighing mechanism over a greater range than a small range having predetermined maximum and minimum values and to one series of electrical pulses upon motion of the weighing mechanism within said small range, means producing an electrical signal of the establishment of a balance position of the weighing mechanism in response to the absence of electrical pulses from at least one of said translating means, and control means automatically effective in response to such signal of balance to initiate said automatic cycle of operations of said system.

2. The improvement defined in claim 1 wherein said motion detecting means comprises a chart mounted on one of the relatively movable weighing parts, a plurality of graduations in spaced positions on said chart, at least a portion of optical projection means arranged to project an image of a portion of said chart graduations, and a pair of photosensitive elements mounted on another of the relatively movable weighing parts in position to receive said image portion and to be alternately illuminated and nonilluminated thereby during weighing motion of the weighing mechanism, said signal producing means being responsive to the cessation of said alternate illumination and nonillumination of at least one of said photosensitive elements, and said photosensitive elements being so spaced relative to projected chart graduation images that in every balance position of the weighing mechanism wherein one of said photosensitive elements receives the image of an edge of a chart graduation the other said photosensitive element will not receive the image of an edge of a chart graduation unless the movable weighing parts move through a distance greater than said minimum value range.

3. In an automatic weighing, computing and recording system which includes (a) a weighing mechanism having relatively movable weighing parts adapted to be deflected away from a zero reference position in proportion to the weight of a load applied thereto to a balance position corresponding to such load, (b) read-out means for converting each balance position of the weighing mechanism into weight information, (c) a computer for receiving and temporarily storing said weight information from the read-out means and for computing and temporarily storing the monetary value of each weighed load, (d) recording means connected to receive from the computer such stored weight and value information and to record such information upon receipt thereof, and (e) control means for initiating an automatic cycle of operations of said system including weight read-out of each balance position of the scale, computing, and recording the weight and monetary value of each of a plurality of successively weighed loads, the improvement comprising motion detecting means effective to distinguish weighing motion of the weighing mechanism from vibrational movement of the moving parts thereof with respect to each balance position of the weighing mechanism, said motion detecting means comprising a chart mounted on one of the relatively movable weighing parts, a plurality of graduations in spaced positions on said chart, at least a portion of optical projection means arranged to project an image of a portion of said chart graduations, a pair of photosensitive elements mounted on another of the relatively movable weighing parts in position to receive said image portion and to be alternately illuminated and nonilluminated thereby during weighing motion of the weighing mechanism, means causing said initiating action of said control means (e) by transmitting thereto a signal of balance in response to cessation of said alternate illumination and nonillumination of at least one of said photosensitive elements, and said photosensitive elements being so spaced relative to projected chart graduation images that in every balance position of the weighing mechanism wherein one of said photosensitive elements receives the image of an edge of a chart graduation the other said photosensitive element will not receive the image of an edge of a chart graduation unless the movable weighing parts move through a range substantially greater than the range necessary to cause the first named said edge image to oscillate across the entire field of view of said one phtocell.

References Cited

UNITED STATES PATENTS

| | | | |
|---|---|---|---|
| 3,042,128 | 7/1962 | Bell et al. | 177—210 |
| 3,044,691 | 7/1962 | Allen | 177—3 X |
| 3,061,026 | 10/1962 | Hecox et al. | 117—13 |
| 3,064,743 | 11/1962 | Marshall et al. | 117—3 |
| 3,163,247 | 12/1964 | Bell et al. | 177—3 |

FOREIGN PATENTS 173,332  11/1960  Sweden.

RICHARD B. WILKINSON, Primary Examiner

G. H. MILLER, JR., Assistant Examiner

U.S. Cl. X.R.

235—154